(12) United States Patent
Yahagi

(10) Patent No.: US 7,124,263 B2
(45) Date of Patent: Oct. 17, 2006

(54) MEMORY CONTROLLER, SEMICONDUCTOR INTEGRATED CIRCUIT, AND METHOD FOR CONTROLLING A MEMORY

(75) Inventor: Kunihiko Yahagi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 401 days.

(21) Appl. No.: 10/717,570

(22) Filed: Nov. 21, 2003

(65) Prior Publication Data

US 2005/0010718 A1    Jan. 13, 2005

(30) Foreign Application Priority Data

Jul. 9, 2003   (JP)   ............... P2003-194467

(51) Int. Cl.
  *G06F 12/00*   (2006.01)
  *G06F 1/12*    (2006.01)
  *G06F 1/04*    (2006.01)
  *G06K 5/04*    (2006.01)

(52) U.S. Cl. ................ 711/156; 711/154; 711/5; 713/400; 713/500; 714/699; 714/700

(58) Field of Classification Search ............. 711/156, 711/154, 5; 713/400, 500, 503; 714/699, 714/700, 702, 701
See application file for complete search history.

(56) References Cited

U.S. PATENT DOCUMENTS

| | | | | |
|---|---|---|---|---|
| 5,754,557 A | * | 5/1998 | Andrewartha | ................ 714/718 |
| 6,151,682 A | * | 11/2000 | van der Wal et al. | ........ 713/401 |
| 6,661,422 B1 | * | 12/2003 | Valmiki et al. | ............. 345/530 |

FOREIGN PATENT DOCUMENTS

| | | |
|---|---|---|
| JP | 2002-288037 | 10/2002 |
| JP | 2002-328837 | 11/2002 |
| JP | 2004-310394 | 11/2004 |

* cited by examiner

*Primary Examiner*—Kimberly McLean-Mayo
(74) *Attorney, Agent, or Firm*—Oblon, Spivak, McClelland, Maier & Neustadt, P.C.

(57) ABSTRACT

A memory controller includes a state generator configured to generate a plurality of state information signals in response to command requests associated with a plurality of banks in a memory. An enable signal generator is configured to generate a plurality of enable signals indicating whether the state information signals are valid or invalid. A bank controller is configured to generate a command based on the state information signals and the enable signals.

18 Claims, 7 Drawing Sheets

| CST2 \ CST1 | WAIT | ACTIVE | READ/WRITE | PRECHARGE |
|---|---|---|---|---|
| WAIT | 0 | 1 | 1 | 1 |
| ACTIVE | 0 | 0 | 1 | 0 |
| READ/WRITE | 0 | 0 | 0 | 0 |
| PRECHARGE | 0 | 1 | 1 | 0 |

| CST2 \ CST1 | WAIT | ACTIVE | READ/WRITE | PRECHARGE |
|---|---|---|---|---|
| WAIT | 0 | 0 | 0 | 0 |
| ACTIVE | 1 | 0 | 0 | 1 |
| READ/WRITE | 1 | 1 | 0 | 1 |
| PRECHARGE | 1 | 0 | 0 | 0 |

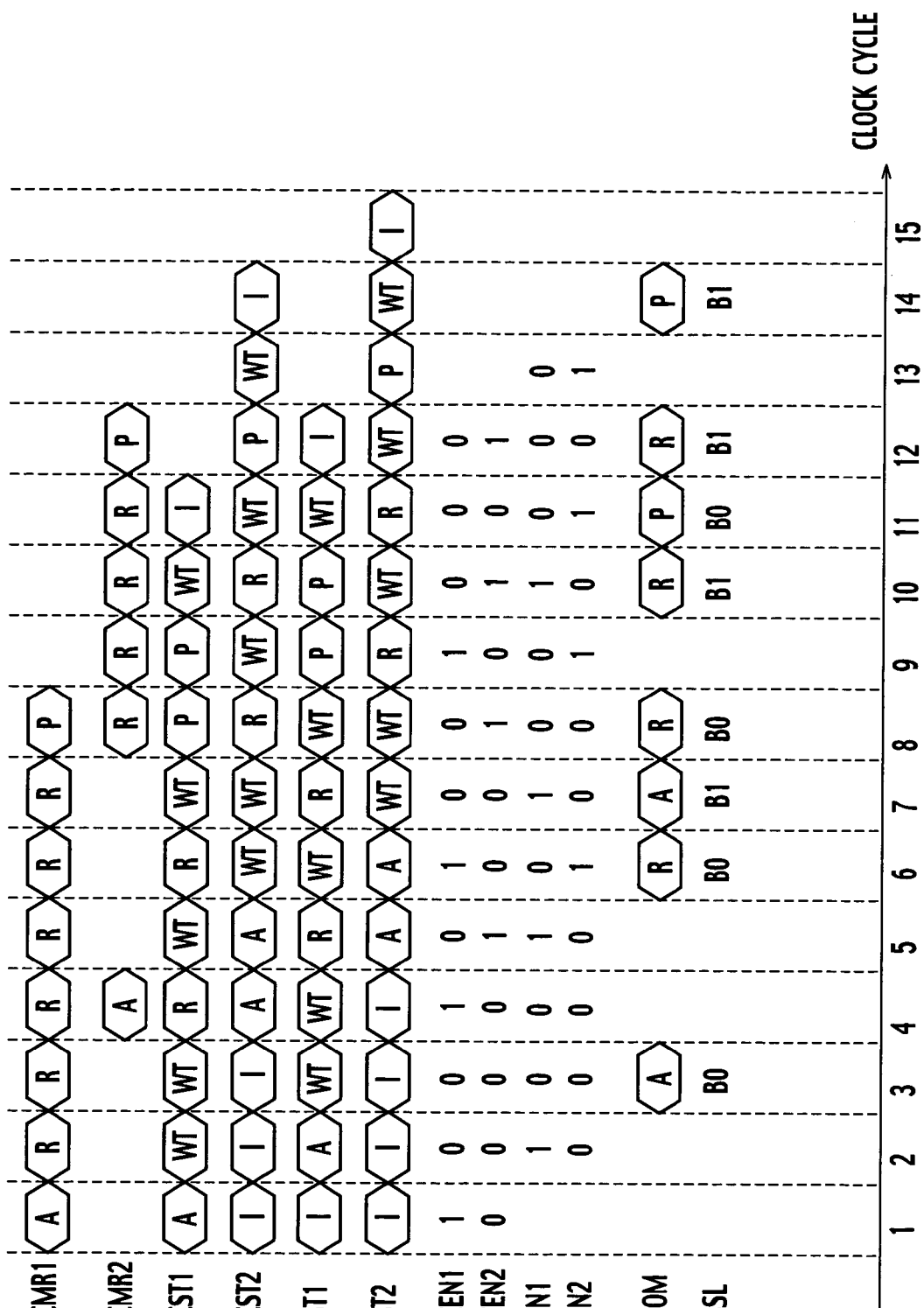

MEMORY CONTROLLER, SEMICONDUCTOR INTEGRATED CIRCUIT, AND METHOD FOR CONTROLLING A MEMORY

CROSS REFERENCE TO RELATED APPLICATION

This application is based upon and claims the benefit of priority from prior Japanese Patent Application P2003-194467 filed on Jul. 9, 2003; the entire contents of which are incorporated by reference herein.

BACKGROUND OF THE INVENTION

1. Field of the Invention

The present invention relates to a synchronous dynamic random access memory (SDRAM) and, more particularly, to a memory controller controlling the SDRAM, a semiconductor integrated circuit monolithically integrating the memory controller on a single semiconductor chip, and a method for controlling a memory.

2. Description of the Related Art

An SDRAM is widely used as a frame memory in a moving picture experts group (MPEG) codec and as a memory in a main storage or the like of a computer. The SDRAM has a plurality of banks used as storage areas. A memory controller controlling the SDRAM supplies a command to the SDRAM in response to a command request from an external device. The commands include an active command, a write command, a read command, and a precharge command and the like. The memory controller generates one command in one clock cycle in accordance with the command request associated with the banks. The memory controller includes state machines associated with the banks in order to generate the commands at appropriate times, and the state machines manage command generation. The term "state machine" refers to the circuit transferring a plurality of states in a preset order, based on an input condition. The technique has been proposed of efficiently generating the command by supervising the states of each state machines associated with the banks.

Mutually supervising the states of the state machines requires, for the input conditions, state information signal of the other state machines and state information signal of the other state machines after a lapse of one clock cycle. Since the circuit scale and complexity of the state machines increase in proportion to the number of the input conditions, the time required for designing the memory controller and the circuit scale of the memory controller increase. Since the state machines exchange information with each other, a timing loop causing unstable data occurs.

SUMMARY OF THE INVENTION

An aspect of the present invention inheres in a memory controller encompassing, a state generator configured to generate a plurality of state information signals in response to command requests associated with a plurality of banks in a memory, a enable signal generator configured to generate a plurality of enable signals indicating whether the state information signals are valid or not, and a bank controller configured to generate a command based on the state information signals and the enable signals.

Another aspect of the present invention inheres in a semiconductor integrated circuit encompassing, a memory controller integrated on a semiconductor chip and configured to control a memory by generating a plurality of state information signals and a plurality of enable signals indicating whether the state information signals are valid or invalid, in response to command requests associated with a plurality of banks in the memory, and a signal processor integrated on the semiconductor chip and configured to perform signal processing and to transmit the command requests to the memory controller.

Still another aspect of the present invention inheres in a method for controlling a memory encompassing, generating a plurality of state information signals in response to command requests associated with a plurality of banks in a memory, generating a plurality of enable signals indicating whether the state information signals are valid or invalid, and generating a command based on the state information signals and the enable signals.

BRIEF DESCRIPTION OF THE DRAWINGS

FIG. 2 is a block diagram showing a bank controller according to the embodiment of the present invention;

FIG. 5 is a flow chart showing a method for controlling a memory according to the embodiment of the present invention;

FIGS. 6A to 6L are timing charts showing a group of state information signals using a common horizontal axis extending with time for explaining an operation of a memory controller according to the embodiment of the present invention, respective pieces of state information signals are connected by dashed lines to show relative timing;

DETAILED DESCRIPTION OF EMBODIMENTS

Figure 1:
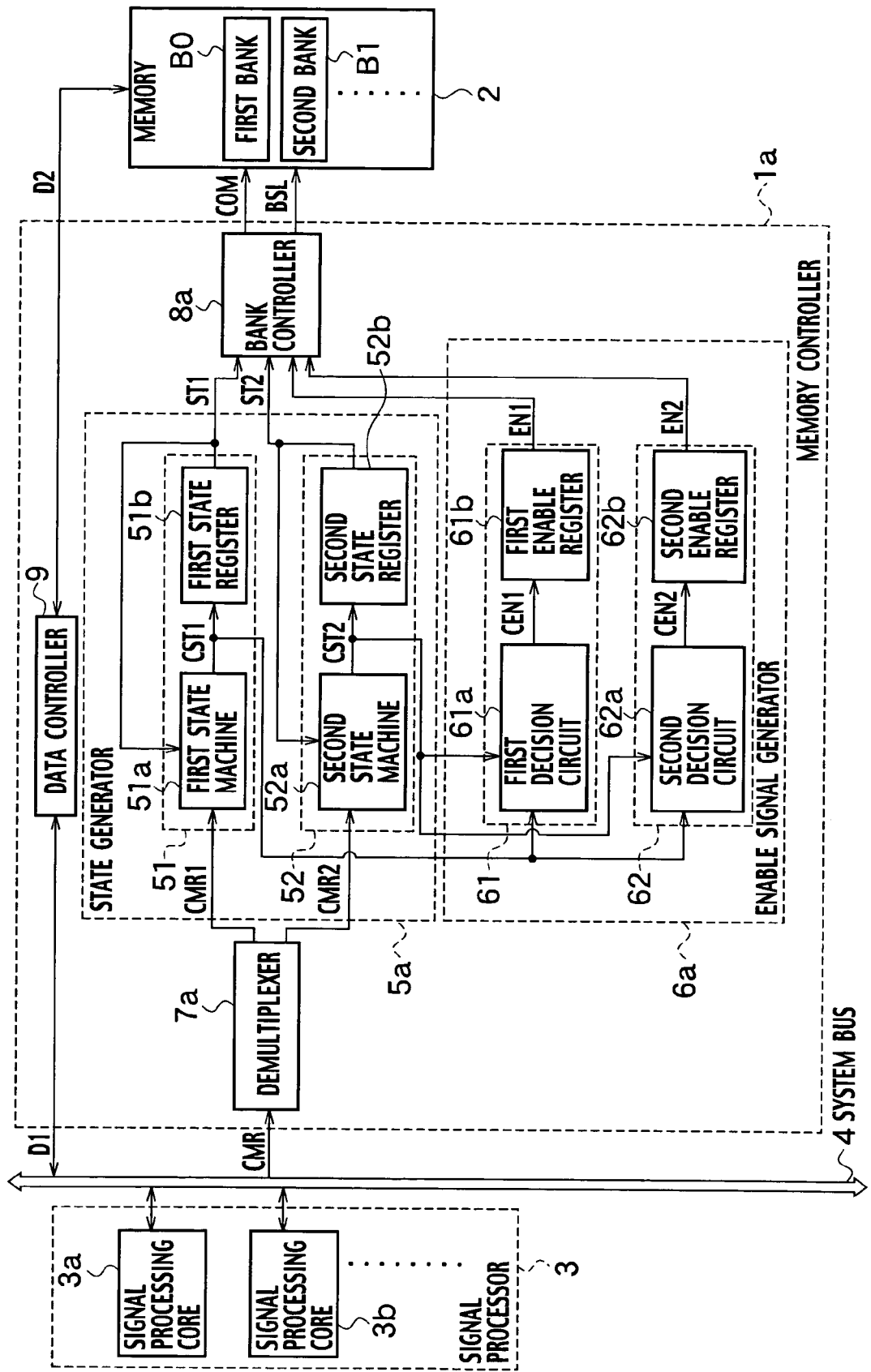
FIG. 1 is a block diagram showing a memory system according to an embodiment of the present invention.

Various embodiments of the present invention will be described with reference to the accompanying drawings. It is to be noted that the same or similar reference numerals are applied to the same or similar parts and elements throughout the drawings, and description of the same or similar parts and elements will be omitted or simplified. In the following descriptions, numerous specific details are set forth such as specific signal values, etc. to provide a thorough understanding of the present invention. However, it will be obvious to those skilled in the art that the present invention may be practiced without such specific details. In other instances, well-known circuits have been shown in block diagram form in order not to obscure the present invention with unnecessary detail. In the following description, the words "connect" or "connected" defines a state in which first and second elements are electrically connected to each other without regard to whether or not there is a physical connection between the elements.

As shown in FIG. 1, a memory system according to an embodiment of the present invention includes a memory 2, a memory controller 1a connected to the memory 2, a system bus 4 connected to the memory controller 1a, and a signal processor 3 connected to the system bus 4. The memory controller 1a controls the memory 2 by generating a plurality of state information signals ST1, ST2, . . . and a plurality of enable signals EN1, EN2, . . . indicating whether the state information signals ST1, ST2, . . . are valid or invalid, in response to command requests CMR1, CMR2, . . . to a plurality of banks B0, B1, . . . in the memory 2. Herein, the term "state information signal" refers to the information required for generating a command COM to be supplied to the memory 2. The signal processor 3 performs signal processing and transmits the command request CMR to the memory controller 1a through the system bus 4. An SDRAM having a plurality of banks such as the first bank BO, the second bank B1, . . . can be used as the memory 2. The signal processor 3 includes a plurality of signal processing cores 3a, 3b.

The memory controller 1a includes a data controller 9, a demultiplexer 7a, a state generator 5a, an enable signal generator 6a, and a bank controller 8a. The data controller 9 is connected between the system bus 4 and the memory 2. The demultiplexer 7a is connected to the system bus 4. The state generator 5a is connected to the demultiplexer 7a. The enable signal generator 6a is connected to the state generator 5a. The bank controller 8a is connected to the state generator 5a and the enable signal generator 6a. The state generator 5a generates the state information signals ST1, ST2, . . . in response to the command requests CMR1, CMR2, . . . associated with the banks B0, B1,. . . . The enable signal generator 6a generates the enable signals EN1, EN2, . . . indicating whether the state information signals ST1, ST2, . . . are valid or not. The bank controller 8a generates the command COM based on the state information signals ST1, ST2, . . . and the enable signals EN1, EN2, . . . . The data controller 9 controls write/read data D1 and D2 which are transmitted and received between the system bus 4 and the memory 2.

The state generator 5a includes, for example, a first state generator 51 and a second state generator 52 connected between the demultiplexer 7a and the bank controller 8a. The first state generator 51 generates the first state information signal ST1 which is one of the state information signals ST1, ST2, . . . and first next-cycle state information signal CST1 indicating the state of the first state information signal ST1 after a lapse of one clock cycle. The second state generator 52 generates the second state information signal ST2 which is one of the state information signals ST1, ST2, . . . and second next-cycle state information signal CST2 indicating the state of the second state information signal ST2 after a lapse of one clock cycle. The demultiplexer 7a supplies, for example, a first command request CMR1 and a second command request CMR2 to the first state generator 51 and the second state generator 52, respectively.

Furthermore, the first state generator 51 includes a first state machine 51a connected to the demultiplexer 7a and the bank controller 8a, and a first state register 51b connected to the first state machine 51a. The first state machine 51a generates the first next-cycle state information signal CST1 based on the first command request CMR1 and the first state information signal ST1. The first state register 51b latches the first next-cycle state information signal CST1 and supplies the first state information signal ST1 to the bank controller 8a.

The second state generator 52 includes a second state machine 52a connected to the demultiplexer 7a and the bank controller 8a, and a second state register 52b connected to the second state machine 52a. The second state machine 52a generates the second next-cycle state information signal CST2 based on the second command request CMR2 and the second state information signal ST2. The second state register 52b latches the second next-cycle state information signal CST2 and supplies the second state information signal ST2 to the bank controller 8a.

The enable signal generator 6a includes, for example, a first enable signal generator 61 and a second enable signal generator 62 connected between the state generator 5a and the bank controller 8a. The first enable signal generator 61 generates the first enable signal EN1 which is one of the enable signals EN1, EN2, . . . , base on the first next-cycle state information signal CST1 and the second next-cycle state information signal CST2. The second enable signal generator 62 generates the second enable signal EN2 which is one of the enable signals EN1, EN2, . . . , base on the first next-cycle state information signal CST1 and the second next-cycle state information signal CST2.

The first enable signal generator 61 includes a first decision circuit 61a and a first enable register 61b. The first decision circuit 61a is connected to a connection node of the first state machine 51a and the first state register 51b and a connection node of the second state machine 52a and the second state register 52b. The first enable register 61b is connected between the first decision circuit 61a and the bank controller 8a. The first decision circuit 61a assigns a priority to the first next-cycle state information signal CST1 or the second next-cycle state information signal CST2 and generates a first next-cycle enable signal CEN1. The first enable register 61b latches the first next-cycle enable signal CEN1 and supplies the first enable signal EN1 to the bank controller 8a.

The second enable signal generator 62 includes a second decision circuit 62a and a second enable register 62b. The second decision circuit 62a is connected to a connection node between the first state machine 51a and the first state register 51b, and a connection node between the second state machine 52a and the second state register 52b. The second enable register 62b is connected between the second decision circuit 62a and the bank controller 8a. The second decision circuit 62a assigns a priority to the first next-cycle state information signal CST1 or the second next-cycle state information signal CST2 and generates a second next-cycle enable signal CEN2. The second enable register 62b latches the second next-cycle enable signal CEN2 and supplies the second enable signal EN2 to the bank controller 8a.

As shown in FIG. 2, the bank controller 8a includes a first state terminal 80a, a second state terminal 80b, a first enable terminal 80c, a second enable terminal 80d, a command terminal 80e, a bank select terminal 80f, a first command generator 81, a second command generator 82, a bank selector 83a, a command register 86, and a select signal register 87. The first command generator 81 is connected to the first state terminal 80a and the first enable terminal 80c. The second command generator 82 is connected to the second state terminal 80b and the second enable terminal 80d. The bank selector 83a is connected to the first enable terminal 80c and the second enable terminal 80d. The command register 86 has an input side connected to the first command generator 81 and the second command generator 82 and an output side connected to the command terminal 80e. The select signal register 87 is connected between the bank selector 83a and the bank select terminal 80f.

The first command generator 81 generates the command COM in accordance with the first state information signal ST1 when the first enable signal EN1 is valid. The second command generator 82 generates the command COM in accordance with the second state information signal ST2 when the second enable signal EN2 is valid. The command register 86 latches the command COM and supplies the command COM to the memory 2 shown in FIG. 1 thorough the command terminal 80e. The bank selector 83a generates a bank select signal BSL based on the first enable signal EN1 and the second enable signal EN2. The select signal register 87 latches the bank select signal BSL and supplies the bank select signal BSL to the memory 2 through the bank select terminal 80f.

Figure 3:
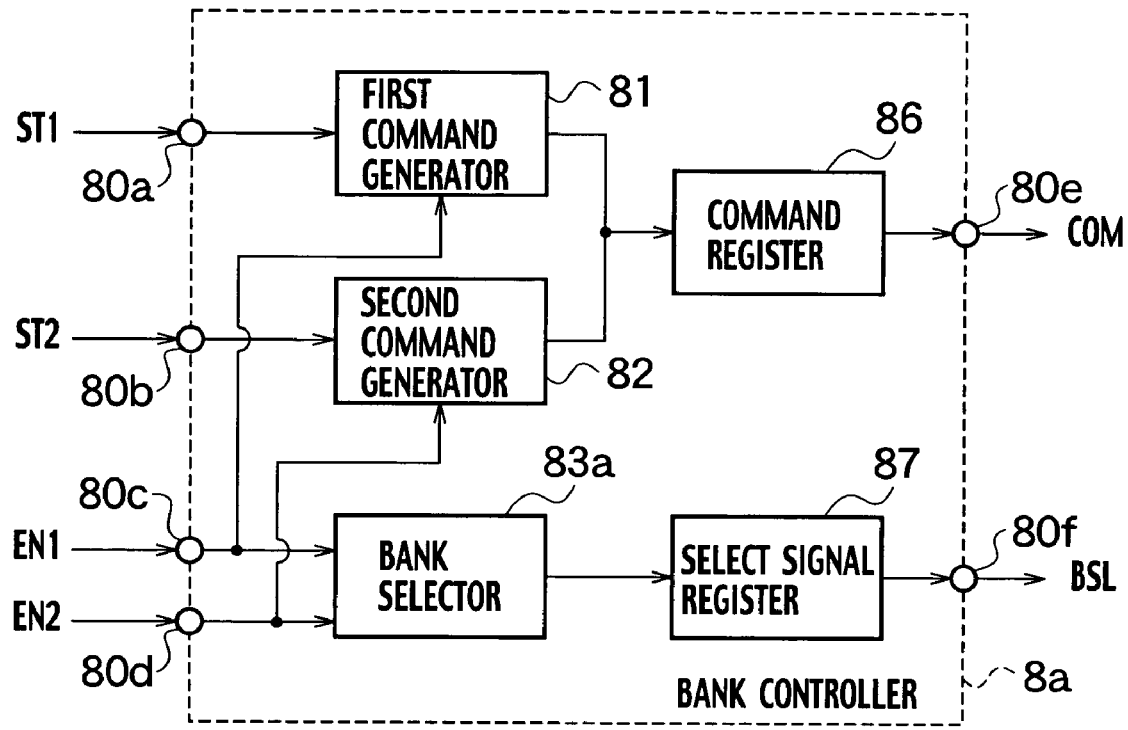
FIG. 3 is a table showing a function of a first decision circuit according to the embodiment of the present invention.

Moreover, the first decision circuit 61a shown in FIG. 1 generates the first next-cycle enable signal CEN1 in accordance with the relationships shown in FIG. 3. A logical value "1" presented in the table of FIG. 3 indicates that the first next-cycle enable signal CEN1 is valid. A logical value "0" indicates that the first next-cycle enable signal CEN1 is invalid. Specifically, the first decision circuit 61a determines that the states of the first next-cycle state information signal CST1 and the second next-cycle state information signal CST2 have no priority when the first and second next-cycle state information signals CST1 and CST2 indicate an equal state. The first decision circuit 61a determines that a read/write state has priority when either the first next-cycle state information signal CST1 or the second next-cycle state information signal CST2 indicates the read/write state. The first decision circuit 61a determines that an active state has priority when a combination of the first next-cycle state information signal CST1 and the second next-cycle state information signal CST2 indicates a combination of the active state and a precharge state.

Figure 4:
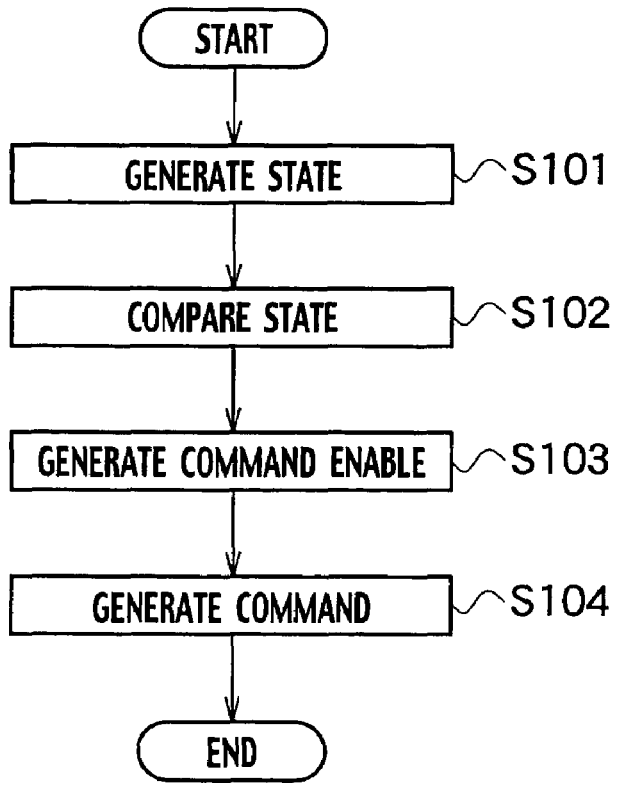
FIG. 4 is a table showing a function of a second decision circuit according to the embodiment of the present invention.

On the other hand, the second decision circuit 62a generates the second next-cycle enable signal CEN2 in accordance with the relationships shown in FIG. 4. A logical value "1" presented in the table of FIG. 4 indicates that the second next-cycle enable signal CEN2 is valid. A logical value "0" indicates that the second next-cycle enable signal CEN2 is invalid. The first decision circuit 61a and the second decision circuit 62a determine that only either the first next-cycle enable signal CEN1 or the second next-cycle enable signal CEN2 is valid, as shown in FIGS. 3 and 4. As a result, the first state machine 51a and the second state machine 52a generate the first next-cycle state information signal CST1 and the second next-cycle state information signal CST2, respectively, without mutually supervising or monitoring the states of the state machines 51a and 52a.

Next, a method for controlling a memory according to the embodiment will be described with reference to FIG. 1 to FIG. 6L.

(A) First, in step S101 of FIG. 5, the first state machine 51a shown in FIG. 1 generates the first next-cycle state information signal CST1 by using as input conditions the first state information signal ST1 shown in FIG. 6E and the first command request CMR1 shown in FIG. 6A, as shown in FIG. 6C. Furthermore, the second state machine 52a generates the second next-cycle state information signal CST2 based on the second state information signal ST2 shown in FIG. 6F and the second command request CMR2 shown in FIG. 6B, as shown in FIG. 6D. In FIGS. 6A to 6F, the letters I, A, WT, R, and P represent an idle state, an active state, a wait state, a read state, and a precharge state, respectively. Moreover, as shown in FIG. 6K, the active state A, the read state R and the precharge state P correspond to the state information signal indicative of command generation. In clock cycles 4 and 8 of FIGS. 6C and 6D, the first state machine 51a and the second state machine 52a simultaneously generate the first next-cycle state information signal CST1 and the second next-cycle state information signal CST2 indicating the command generation, respectively. The first next-cycle state information signal CST1 and the second next-cycle state information signal CST2 are latched by the first state register 51b and the second state register 52b, respectively. Consequently, the first state information signal ST1 and the second state information signal ST2 are generated as shown in FIGS. 6E and 6F.

(B) Second, in step S102, the first decision circuit 61a determines which of the first next-cycle state information signal CST1 and the second next-cycle state information signal CST2 has priority based on the relationships shown in FIG. 3. In a clock cycle 1 of FIG. 6G since the first next-cycle state information signal CST1 shown in FIG. 6C and the second next-cycle state information signal CST2 shown in FIG. 6D indicate the active state A and the idle state I, respectively, the first decision circuit 61a determines that the active state A has priority. In the clock cycle 4 of FIG. 6C, since the first next-cycle state information signal CST1 and the second next-cycle state information signal CST2 indicate the read state R and the active state A, respectively, the first decision circuit 61a determines that the read state R has priority. In a clock cycle 6 of FIG. 6G, since the first next-cycle state information signal CST1 and the second next-cycle state information signal CST2 indicate the read state R and the wait state WT, respectively, the first decision circuit 61a determines that the read state R has priority. In a clock cycle 9 of FIG. 6G, since the first next-cycle state information signal CST1 and the second next-cycle state information signal CST2 indicate the precharge state P and the wait state WT, respectively, the first decision circuit 61a determines that the precharge state P has priority.

(C) On the other hand, the second decision circuit 62a determines which of the first next-cycle state information signal CST1 and the second next-cycle state information signal CST2 has priority based on the relationships shown in FIG. 4. In a clock cycle 5 of FIG. 6H, since the first next-cycle state information signal CST1 and the second next-cycle state information signal CST2 indicate the wait state WT and the active state A, respectively, the second decision circuit 62a determines that the active state A has priority. In the clock cycle 8 of FIG. 6H, since the first next-cycle state information signal CST1 and the second next-cycle state information signal CST2 indicate the precharge state P and the read state R, respectively, the second decision circuit 62a determines that the read state R has priority.

(D) Next, in step S103, the first decision circuit 61a generates the first next-cycle enable signal CEN1 in accordance with the priority determined in step S102. Furthermore, the second decision circuit 62a generates the second next-cycle enable signal CEN2. Consequently, the first decision circuit 61a generates the logical value "1" in the clock cycles 1, 4, 6 and 9 of FIG. 6G. The first decision circuit 61a generates the logical value "0" in the clock cycles 2, 3, 5, 7, 8, and 10 to 12 of FIG. 6G. On the other hand, the second decision circuit 62a generates the logical value "1" in the clock cycles 5, 8, 10 and 12 of FIG. 6H. The second decision circuit 62a generates the logical value "0" in the clock cycles 1 to 4, 6, 7, 9 and 11 of FIG. 6H. The first next-cycle enable signal CEN1 and the second next-cycle enable signal CEN2 are latched by the first enable register 61b and the second enable register 62b, respectively. Consequently, the first enable signal EN1 and the second enable signal EN2 are generated as shown in FIGS. 6I and 6J, respectively.

(E) Next, in step S104, the first command generator 81 shown in FIG. 2 generates the command corresponding to the first state information signal ST1, when the first enable signal EN1 indicates the logical value "1" and the first state information signal ST1 indicates the state indicative of the command generation. Moreover, the second command generator 82 generates the command corresponding to the second state information signal ST2, when the second enable signal EN2 indicates the logical value "1" and the second state information signal ST2 indicates the state indicative of the command generation. When either the first enable signal EN1 or the second enable signal EN2 indicates the logical value "1", the bank selector 83*a* selects the first bank B0 if the first enable signal EN1 indicates the logical value "1", or the bank selector 83*a* selects the second bank B1 if the second enable signal EN2 indicates the logical value "1".

(F) In the clock cycle 3 of FIG. 6K, the first command generator 81 and the command register 86 generate an active command as the command COM based on the first state information signal ST1 indicating the active state A in the clock cycle 2 of FIG. 6E. As shown in FIGS. 6K and 6L, the active command generated in the clock cycle 3 is performed on the first bank B0 in accordance with the bank select signal BSL. In the clock cycle 6 of FIG. 6K, the first command generator 81 and the command register 86 generate a read command as the command COM based on the first state information signal ST1 indicating the read state R in the clock cycle 5 of FIG. 6E. As shown in FIGS. 6K and 6L, the read command generated in the clock cycle 6 is performed on the first bank B0 in accordance with the bank select signal BSL. In the clock cycle 7 of FIG. 6K, the second command generator 82 and the command register 86 generate an active command as the command COM based on the second state information signal ST2 indicating the active state A in the clock cycle 6 of FIG. 6F. As shown in FIGS. 6K and 6L, the active command generated in the clock cycle 7 is performed on the second bank B1 in accordance with the bank select signal BSL. The same processing is performed in the clock cycles 8 to 14 of FIGS. 6K and 6L. The memory 2 is controlled by the bank controller 8*a*, and thus the write/read data D1 and D2 are inputted and outputted between the memory 2 and the system bus 4 via the data controller 9.

As described above, the first state machine 51*a* and the second state machine 52*a* according to the embodiment do not increase the circuit scale and complexity because the state machines 51*a* and 52*a* do not transmit information to each other and do not receive information from each other. Moreover, the first decision circuit 61*a* and the second decision circuit 62*a* can be configured using simple logic, unlike the first state machine 51*a* and the second state machine 52*a*, as can be seen from FIGS. 3 and 4. Therefore, it is possible to configure the memory controller 1*a* which is capable of efficiently performing the command generation and is configurable as a small scale circuit. Furthermore, since the complexity does not increase, it is possible to configure a memory controller 1*a* which does not cause a timing loop and which can be designed in a short time.

Figure 7:
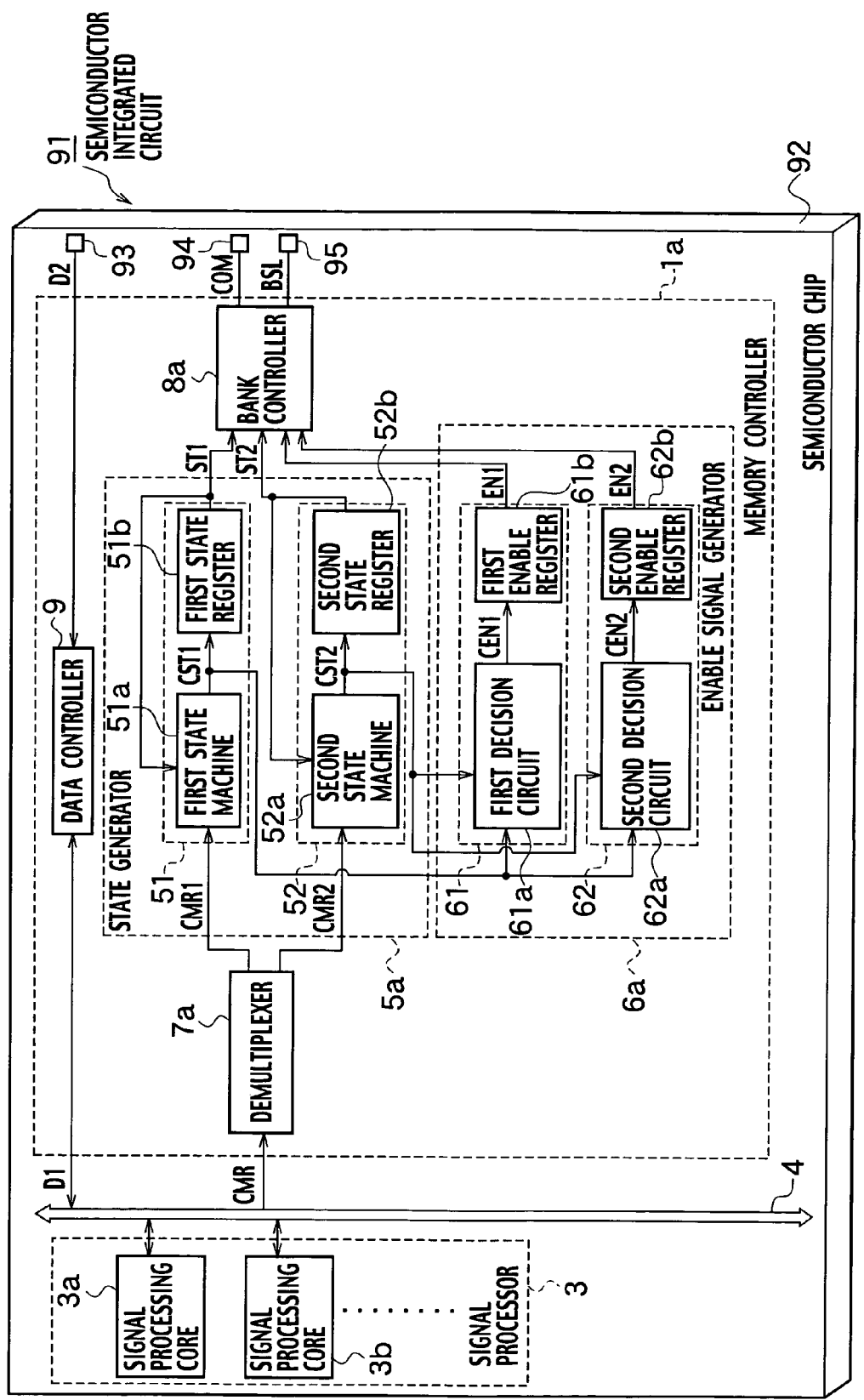
FIG. 7 is a schematic diagram showing a semiconductor integrated circuit according to the embodiment of the present invention.

As shown in FIG. 7 for example, the memory controller 1*a*, the system bus 4, and signal processor 3 shown in FIG. 1 can be monolithically integrated on a single semiconductor chip 92, and a semiconductor integrated circuit 91 can be formed. In the example shown in FIG. 7, the semiconductor integrated circuit 91 further includes bonding pads 93 to 95 on the semiconductor chip 92. The bonding pad 93 is an internal terminal for inputting and outputting the write/read data D2 to the memory 2 shown in FIG. 1. The bonding pad 94 is an internal terminal for transmitting the command COM to the memory 2. The bonding pad 95 is an internal terminal for transmitting the bank select signal BSL to the memory 2.

(Modification of Embodiment)

Figure 8:
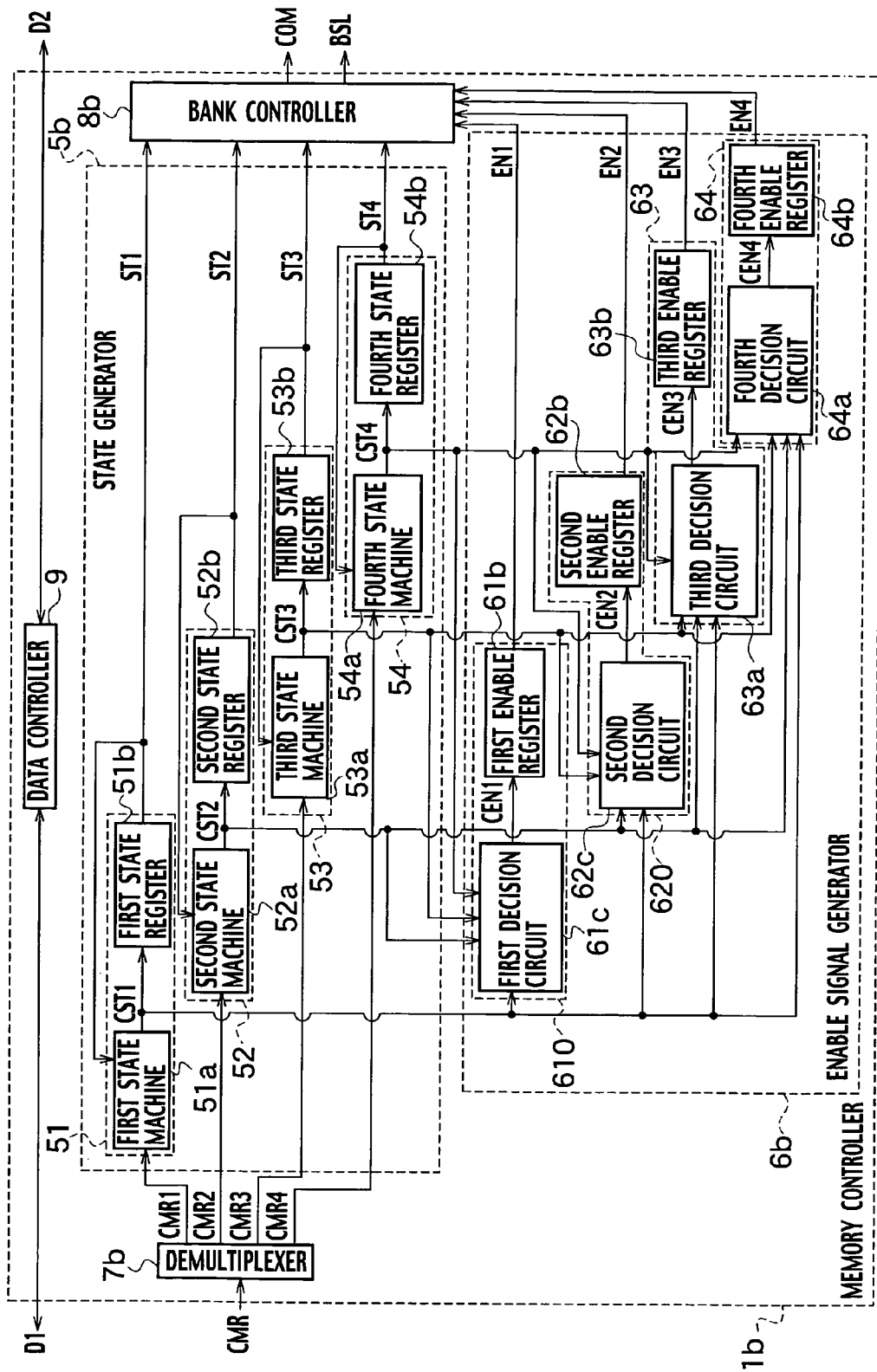
FIG. 8 is a block diagram showing a memory controller according to a modification of the embodiment.

A memory controller 1*b* according to a modification of the embodiment of the present invention may be configured to be applicable to an SDRAM having four banks, as shown in FIG. 8 for example. Specifically, a demultiplexer 7*b* supplies, as the command requests associated with the banks, the first command request CMR1, the second command request CMR2, a third command request CMR3 and a fourth command request CMR4, to a state generator 5*b*. The state generator 5*b* is different from the state generator 5*a* shown in FIG. 1 in that the state generator 5*b* further generates third state information signal ST3 and fourth state information signal ST4 included in the state information signals ST1, ST2, . . . in response to the third command request CMR3 and the fourth command request CMR4, respectively. An enable signal generator 6*b* is different from the enable signal generator 6*a* shown in FIG. 1 in that the enable signal generator 6*b* further generates a third enable signal EN3 indicating whether the third state information signal ST3 is valid or invalid and a fourth enable signal EN4 indicating whether the fourth state information signal ST4 is valid or invalid. A bank controller 8*b* further receives the third state information signal ST3, the fourth state information signal ST4, the third enable signal EN3, and the fourth enable signal EN4.

The state generator 5*b* further includes a third state generator 53 and a fourth state generator 54 connected between the demultiplexer 7*b* and the bank controller 8*b*. The third state generator 53 generates the third state information signal ST3 and a third next-cycle state information signal CST3 indicating the state of the third state information signal ST3 after a lapse of one clock cycle. The fourth state generator 54 generates the fourth state information signal ST4 and a fourth next-cycle state information signal CST4 indicating the state of the fourth state information signal ST4 after a lapse of one clock cycle.

The enable signal generator 6*b* further includes a third enable signal generator 63 and a fourth enable signal generator 64 connected between the state generator 5*b* and the bank controller 8*b*. The first enable signal generator 610 generates the first enable signal EN1 based on the first to fourth next-cycle state information signals CST1 to CST4. The second enable signal generator 620 generates the second enable signal EN2 based on the first to fourth next-cycle state information signals CST1 to CST4. The third enable signal generator 63 generates the third enable signal EN3 based on the first to fourth next-cycle state information signals CST1 to CST4. The fourth enable signal generator 64 generates the fourth enable signal EN4 based on the first to fourth next-cycle state information signals CST1 to CST4.

In addition, the third state generator 53 includes a third state machine 53*a* connected the demultiplexer 7*b* and the bank controller 8*b*, and a third state register 53*b* connected the third state machine 53*a*. The third state machine 53*a* generates a third next-cycle state information signal CST3 based on the third command request CMR3 and the third state information signal ST3. The third state register 53*b* latches the third next-cycle state information signal CST3 and supplies the third state information signal ST3 to the bank controller 8b.

The fourth state generator 54 includes a fourth state machine 54a connected the demultiplexer 7b and the bank controller 8b, and a fourth state register 54b connected the fourth state machine 54a. The fourth state machine 54a generates a fourth next-cycle state information signal CST4 based on the fourth command request CMR4 and the fourth state information signal ST4. The fourth state register 54b latches the fourth next-cycle state information signal CST4 and supplies the fourth state information signal ST4 to the bank controller 8b.

The third enable signal generator 63 includes a third decision circuit 63a and a third enable register 63b. The third decision circuit 63a is connected to a connection node between the first state machine 51a and the first state register 51b, a connection node between the second state machine 52a and the second state register 52b, a connection node between the third state machine 53a and the third state register 53b, and a connection node between the fourth state machine 54a and the fourth state register 54b. The third enable register 63b is connected between the third decision circuit 63a and the bank controller 8b. The third decision circuit 63a assigns a priority to the first to fourth next-cycle state information signals CST1 to CST4 and generates a third next-cycle enable signal CEN3. The third enable register 63b latches the third next-cycle enable signal CEN3 and supplies the third enable signal EN3 to the bank controller 8b.

The fourth enable signal generator 64 includes a fourth decision circuit 64a and a fourth enable register 64b. The fourth decision circuit 64a is connected to the connection node between the first state machine 51a and the first state register 51b, the connection node between the second state machine 52a and the second state register 52b, the connection node between the third state machine 53a and the third state register 53b, and the connection node between the fourth state machine 54a and the fourth state register 54b. The fourth enable register 64b is connected between the fourth decision circuit 64a and the bank controller 8b. The fourth decision circuit 64a assigns a priority to the first to fourth next-cycle state information signals CST1 to CST4 and generates a fourth next-cycle enable signal CEN4. The fourth enable register 64b latches the fourth next-cycle enable signal CEN4 and supplies the fourth enable signal EN4 to the bank controller 8b.

The first decision circuit 61c and the second decision circuit 62c are further connected to the connection node between the third state machine 53a and the third state register 53b and the connection node between the fourth state machine 54a and the fourth state register 54b. The first decision circuit 61c assigns a priority to the first to fourth next-cycle state information signals CST1 to CST4 and generates a first next-cycle enable signal CEN1. The second decision circuit 62c assigns a priority to the first to fourth next-cycle state information signals CST1 to CST4 and generates a second next-cycle enable signal CEN2.

Figure 9:
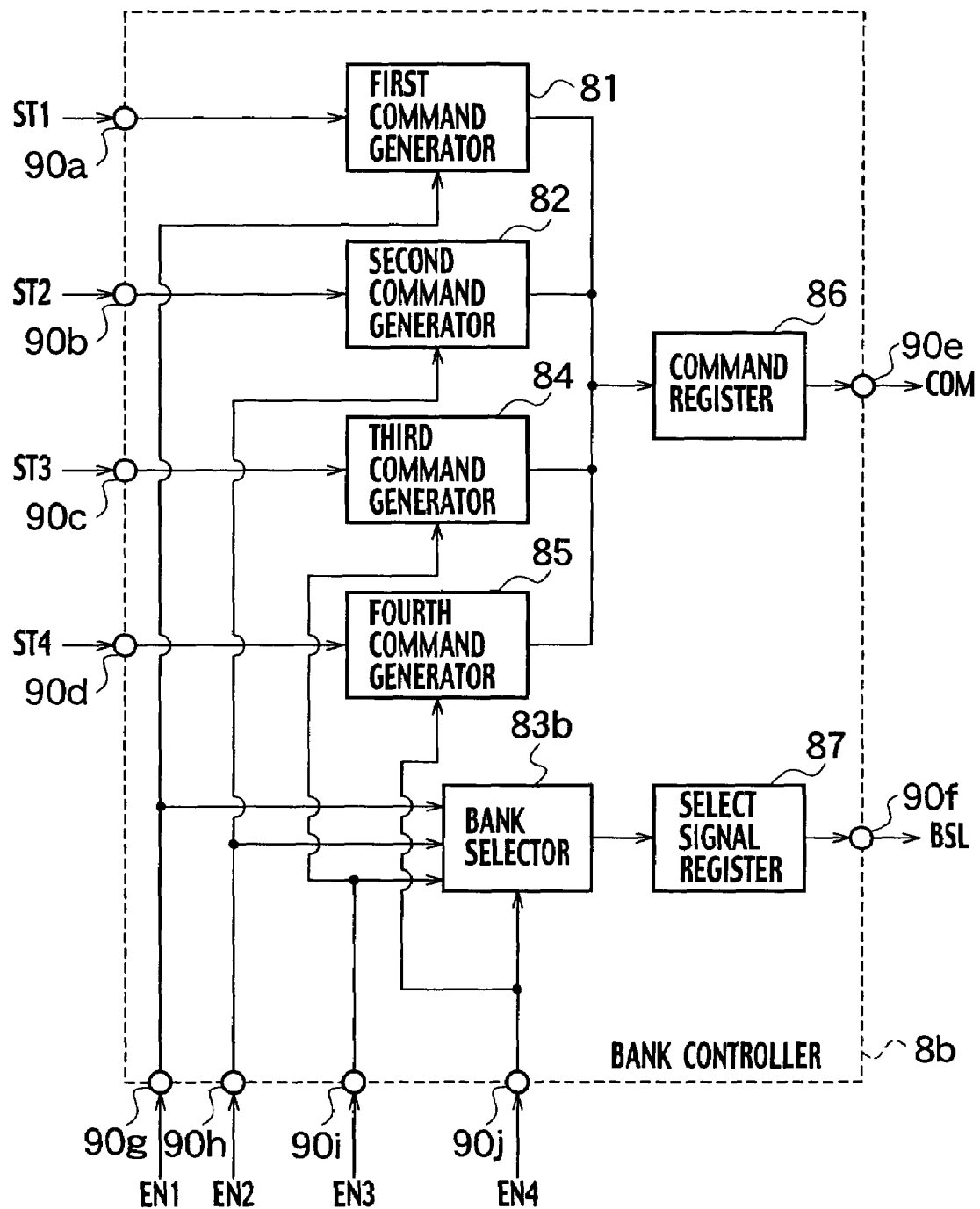
FIG. 9 is a block diagram showing a bank controller according to the modification of the embodiment.

As shown in FIG. 9, the bank controller 8b includes the first state terminal 90a, the second state terminal 90b, a third state terminal 90c, a fourth state terminal 90d, the first enable terminal 90g, the second enable terminal 90h, a third enable terminal 90i, a fourth enable terminal 90j, the command terminal 90e, the bank select terminal 90f, the first command generator 81, the second command generator 82, a third command generator 84, a fourth command generator 85, a bank selector 83b, the command register 86, and the select signal register 87. The third command generator 84 generates the command COM in accordance with the third state information signal ST3 when the third enable signal EN3 is valid. The fourth command generator 85 generates the command COM in accordance with the fourth state information signal ST4 when the fourth enable signal EN4 is valid. The bank selector 83b generates the bank select signal BSL based on the first to fourth enable signals EN1 to EN4.

As described above, the first to fourth state machines 51a to 54a according to the modification of the embodiment do not increase the circuit scale and complexity because the state machines 51a to 54a do not transmit information to one another and do not receive information from one another. On the other hand, input conditions for each state machine become very complicated when the state machines are configured so that the state machines for the respective banks mutually supervise or monitor the states of the each of state machines. Therefore, the memory controller 1b which is capable of efficiently performing the command generation and is configurable on a small circuit scale can be provided also for a SDRAM having four banks.

(Other Embodiments)

Various modifications will become possible for those skilled in the art after receiving the teachings of the present disclosure without departing from the scope thereof.

By referring to the embodiments described above, the description has been given with regard to an example in which the memory controllers 1a and 1b control a memory having two banks and a memory having four banks, respectively. However, the memory controller 1a according to the embodiment may be applied to a memory having n banks (n denotes an integer equal to or more than 2.)

Moreover, the description has been given with regard to the embodiment in which the memory 2 shown in FIG. 1 is not integrated on the semiconductor chip 92 shown in FIG. 7. However, the memory 2 may be integrated on the semiconductor chip 92. In addition, the memory controller 1b according to the modification of the embodiment may be configured as a semiconductor integrated circuit in the same manner as the configuration shown in FIG. 7. In this case as well, the memory 2 may be integrated on the semiconductor chip 92.

What is claimed is:

1. A memory controller comprising:
   a state generator configured to generate a plurality of state information signals in response to command requests associated with a plurality of banks in a memory, including:
      a first state generator configured to generate a first state information signal which is one of the state information signals and a first next-cycle state information signal indicating a state of the first state information signal after a lapse of one clock cycle; and
      a second state generator configured to generate a second state information signal which is one of the state information signals and a second next-cycle state information signal indicating a state of the second state information signal after a lapse of one clock cycle;
   an enable signal generator configured to generate a plurality of enable signals indicating whether the state information signals are valid or invalid; and
   a bank controller configured to generate a command based on the state information signals and the enable signals.

2. The memory controller of claim 1, further comprising a demultiplexer configured to supply a first command request and a second command request to the first state generator and the second state generator as the command requests associated with the banks, respectively.

3. The memory controller of claim 2, wherein the first state generator comprises:
a first state machine configured to generate the first next-cycle state information signal based on the first command request and the first state information signal; and
a first state register configured to latch the first next-cycle state information signal and to supply the first state information signal to the bank controller.

4. The memory controller of claim 2, wherein the second state generator comprises:
a second state machine configured to generate the second next-cycle state information signal based on the second command request and the second state information signal; and
a second state register configured to latch the second next-cycle state information signal and to supply the second state information signal to the bank controller.

5. The memory controller of claim 1, wherein the enable signal generator comprises:
a first enable signal generator configured to generate a first enable signal which is one of the enable signals, based on the first next-cycle state information signal and the second next-cycle state information signal; and
a second enable signal generator configured to generate a second enable signal which is one of the enable signals, based on the first next-cycle state information signal and the second next-cycle state information signal.

6. The memory controller of claim 5, wherein the first enable signal generator comprises:
a first decision circuit configured to assign a priority to one of the first next-cycle state information signal and the second next-cycle state information signal and to generate a first next-cycle enable signal; and
a first enable register configured to latch the first next-cycle enable signal and to supply the first enable signal to the bank controller.

7. The memory controller of claim 5, wherein the second enable signal generator comprises:
a second decision circuit configured to assign a priority to one of the first next-cycle state information signal and the second next-cycle state information signal and to generate a second next-cycle enable signal; and
a second enable register configured to latch the second next-cycle enable signal and to supply the second enable signal to the bank controller.

8. The memory controller of claim 1, wherein the state generator further comprising:
a third state generator configured to generate a third state information signal which is one of the state information signals and a third next-cycle state information signal indicating a state of the third state information signal after a lapse of one clock cycle; and
a fourth state generator configured to generate a fourth state information signal which is one of the state information signals and a fourth next-cycle state information signal indicating the state of the fourth state information signal after a lapse of one clock cycle.

9. The memory controller of claim 8, further comprising a demultiplexer configured to supply first to fourth command requests to the first to fourth state generators as the command requests associated with the banks, respectively.

10. The memory controller of claim 9, wherein the third state generator comprises:
a third state machine configured to generate the third next-cycle state information signal based on the third command request and the third state information signal; and
a third state register configured to latch the third next-cycle state information signal and to supply the third state information signal to the bank controller.

11. The memory controller of claim 9, wherein the fourth state generator comprises:
a fourth state machine configured to generate the fourth next-cycle state information signal based on the fourth command request and the fourth state information signal; and
a fourth state register configured to latch the fourth next-cycle state information signal and to supply the fourth state information signal to the bank controller.

12. The memory controller of claim 8, wherein the enable signal generator comprises:
a first enable signal generator configured to generate the first enable signal based on the first to fourth next-cycle state information signals;
a second enable signal generator configured to generate the second enable signal based on the first to fourth next-cycle state information signals;
a third enable signal generator configured to generate the third enable signal based on the first to fourth next-cycle state information signals; and
a fourth enable signal generator configured to generate the fourth enable signal based on the first to fourth next-cycle state information signals.

13. The memory controller of claim 12, wherein the first enable signal generator comprises:
a first decision circuit configured to assign a priority to the first to fourth next-cycle state information signals and to generate a first next-cycle enable signal; and
a first enable register configured to latch the first next-cycle enable signal and to supply the first enable signal to the bank controller.

14. The memory controller of claim 12, wherein the second enable signal generator comprises:
a second decision circuit configured to assign a priority to the first to fourth next-cycle state information signals and to generate a second next-cycle enable signal; and
a second enable register configured to latch the second next-cycle enable signal and to supply the second enable signal to the bank controller.

15. The memory controller of claim 12, wherein the third enable signal generator comprises:
a third decision circuit configured to assign a priority to the first to fourth next-cycle state information signals and to generate a third next-cycle enable signal; and
a third enable register configured to latch the third next-cycle enable signal and to supply the third enable signal to the bank controller.

16. The memory controller of claim 12, wherein the fourth enable signal generator comprises:
a fourth decision circuit configured to assign a priority to the first to fourth next-cycle state information signals and to generate a fourth next-cycle enable signal; and
a fourth enable register configured to latch the fourth next-cycle enable signal and to supply the fourth enable signal to the bank controller.

17. A semiconductor integrated circuit comprising:

a memory controller integrated on a semiconductor chip and configured to control a memory by generating a plurality of state information signals and a plurality of enable signals indicating whether the state information signals are valid or invalid, in response to command requests associated with a plurality of banks in the memory, including:

a state generator configured to generate the state information signals including:
- a first state generator configured to generate a first state information signal which is one of the state information signals and a first next-cycle state information signal indicating a state of the first state information signal after a lapse of one clock cycle; and
- a second state generator configured to generate a second state information signal which is one of the state information signals and a second next-cycle state information signal indicating a state of the second state information signal after a lapse of one clock cycle;

an enable signal generator configured to generate the enable signals;

a bank controller configured to generate a command based on the state information signals and the enable signals; and a signal processor integrated on the semiconductor chip and configured to perform signal processing and to transmit the command requests to the memory controller.

18. A method for controlling a memory comprising:

generating a plurality of state information signals in response to command requests associated with a plurality of banks in a memory, including:
- generating a first state information signal which is one of the state information signals and a first next-cycle state information signal indicating a state of the first state information signal after a lapse of one clock cycle; and
- generating a second state information signal which is one of the state information signals and a second next-cycle state information signal indicating a state of the second state information signal after a lapse of one clock cycle;

generating a plurality of enable signals indicating whether the state information signals are valid or invalid; and generating a command based on the state information signals and the enable signals.

* * * * *